United States Patent
Boecker et al.

(10) Patent No.: US 12,372,998 B2
(45) Date of Patent: Jul. 29, 2025

(54) SYNCHRONIZATION OF INTEGRATED CIRCUIT DIES THAT CONTAIN A PROCESSOR AND CLOCK GENERATOR BY ADJUSTING DELAY LINES BASED ON PHASE COUNT

(71) Applicant: Microsoft Technology Licensing, LLC, Redmond, WA (US)

(72) Inventors: Charles Walter Boecker, Ames, IA (US); Piyush Abhay Hatolkar, Hillsboro, OR (US); Asad Azam, Portland, OR (US); Maya Subhadra, Portland, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 18/068,461

(22) Filed: Dec. 19, 2022

(65) Prior Publication Data

US 2024/0201730 A1    Jun. 20, 2024

(51) Int. Cl.
*G06F 1/12* (2006.01)
*G06F 1/08* (2006.01)

(52) U.S. Cl.
CPC . *G06F 1/12* (2013.01); *G06F 1/08* (2013.01)

(58) Field of Classification Search
CPC .................. G06F 1/12; G06F 1/08; G06F 1/10
See application file for complete search history.

(56) References Cited

U.S. PATENT DOCUMENTS

| 5,631,591 A * | 5/1997 | Bar-Niv | G06F 1/10 327/12 |
|---|---|---|---|
| 6,763,474 B1 * | 7/2004 | Boerstler | H03L 7/23 713/400 |
| 7,343,510 B1 * | 3/2008 | Ross | G06F 1/04 713/400 |
| 8,583,957 B2 | 11/2013 | Chandhoke et al. | |
| 9,094,564 B2 | 7/2015 | Soldan | |
| 9,595,308 B1 * | 3/2017 | Wallichs | G11C 7/10 |
| 2002/0070761 A1 * | 6/2002 | Abbiate | H03D 13/003 327/48 |
| 2004/0027166 A1 * | 2/2004 | Mangum | G06F 1/12 326/93 |

(Continued)

FOREIGN PATENT DOCUMENTS

| EP | 0986202 A2 | 3/2000 |
| GB | 2404761 A | 2/2005 |
| GB | 2536318 A | 9/2016 |

OTHER PUBLICATIONS

International Search Report and Written Opinion received for PCT Application No. PCT/US23/035754, Jan. 31, 2024, 15 pages.

*Primary Examiner* — Danny Chan
(74) *Attorney, Agent, or Firm* — Holzer Patel Drennan

(57) ABSTRACT

Embodiments of the present disclosure include techniques for synchronizing processors. In one embodiment, one or more processors on different integrated circuit die are synchronized using a synchronization circuit on one of the die. The synchronization circuit receives count phases and adjusts clock signals, and counts in some embodiments, to synchronize the processors. In one embodiment, the synchronization circuit comprises a phase detector that receives particular bits of the count signal as the count phases.

19 Claims, 4 Drawing Sheets

(56) References Cited

U.S. PATENT DOCUMENTS

| | | | |
|---|---|---|---|
| 2004/0117683 A1* | 6/2004 | Waller | G06F 1/12 |
| | | | 713/401 |
| 2014/0146931 A1* | 5/2014 | Sagi | G06F 1/12 |
| | | | 375/362 |
| 2016/0085263 A1 | 3/2016 | Kuzi et al. | |
| 2018/0350411 A1* | 12/2018 | Ware | G11C 7/04 |
| 2019/0044520 A1* | 2/2019 | Tang | G06F 1/12 |
| 2019/0064749 A1* | 2/2019 | Sudo | H03L 7/0996 |
| 2020/0285265 A1* | 9/2020 | Ranganathan | G06F 1/12 |
| 2021/0356986 A1* | 11/2021 | Chang | G06F 1/12 |

\* cited by examiner

SYNCHRONIZATION OF INTEGRATED CIRCUIT DIES THAT CONTAIN A PROCESSOR AND CLOCK GENERATOR BY ADJUSTING DELAY LINES BASED ON PHASE COUNT

BACKGROUND

The present disclosure relates generally to synchronizing electronic systems, and in particular, to processor synchronization systems and methods.

Many electronic systems use a clock to synchronize the timing of operations across the system. Microprocessors are examples of synchronous systems that perform operations on a clock cycle. Such systems may also maintain a count, where operations of the systems occur on particular values of the count. In very high frequency systems, it is important to synchronize clocks (and counts). For example, as the speed of the system increases and the size of the system increases, it may be challenging to synchronize clock and count values across all parts of the system.

DETAILED DESCRIPTION

Described herein are techniques for synchronizing systems. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Features and advantages of the present disclosure include techniques for synchronizing clock signals, and in some embodiments, counts across different portions of a system that may reside at different physical locations and even across different physical semiconductor die, for example.

Figure 1:
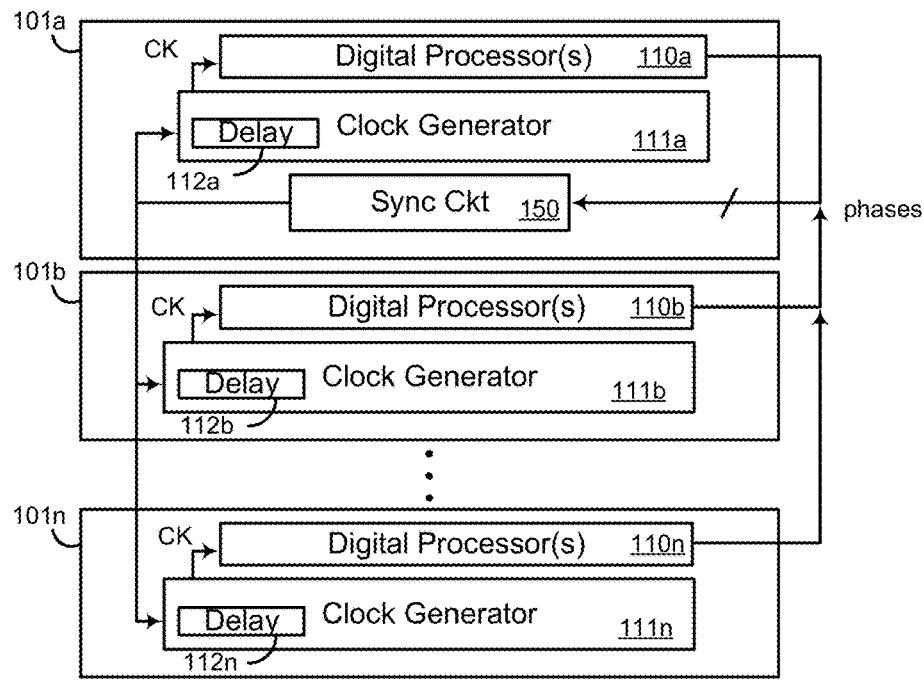
FIG. 1 illustrates a synchronization system according to an embodiment.

FIG. 1 illustrates synchronization system according to an embodiment. System 100 may include multiple physical integrated circuit (IC) die 101a-n. Each IC die 101a-n may include one or more digital processors (denoted 110a-n) that may receive a clock signal (CK) to control timing of the each processor. Clock signals may be generated by clock generators 111a-n on IC die 101a-n, for example. Clock generators 111a-n may include phase locked loops (shown below) and delay lines 112a-n, for example. Processors 110a-n may further have a count (e.g., a system count), which may be a value representing an amount of time (or number of clock cycles) that the processor has been active (e.g., the number of clock cycles since the last system reset). In some cases, multiple processors (e.g., central processing units, CPUs) may be spread out across different locations on each die, and clock signals and system counts on the processors on different die may need to be synchronized.

In this example, IC die 101a includes a synchronization ("sync") circuit 150. Sync circuit 150 uses count phases from digital processors 110a-n to synchronize clock signals (and in some cases counts). More specifically, sync circuit 150 receives count phases from different IC circuit die 101a-n and adjusts delay lines 112a-n in clock generators 111a-n to synchronize clock signals CK (and counts) to digital processors 110a-n. As mentioned above, each of the one or more processors 110a-n on each IC die 101a-n may have a count, which may be a digital value in a system counter, for example. Each count will have a phase relative to the various clocks in the system. Features and advantages of the present disclosure include measuring count phases from IC die 101a-n and adjusting delay lines 112a-n to adjust the clock signals CK to synchronize the clock signals to digital processors 110a-n on IC die 101a-n.

Figure 2:
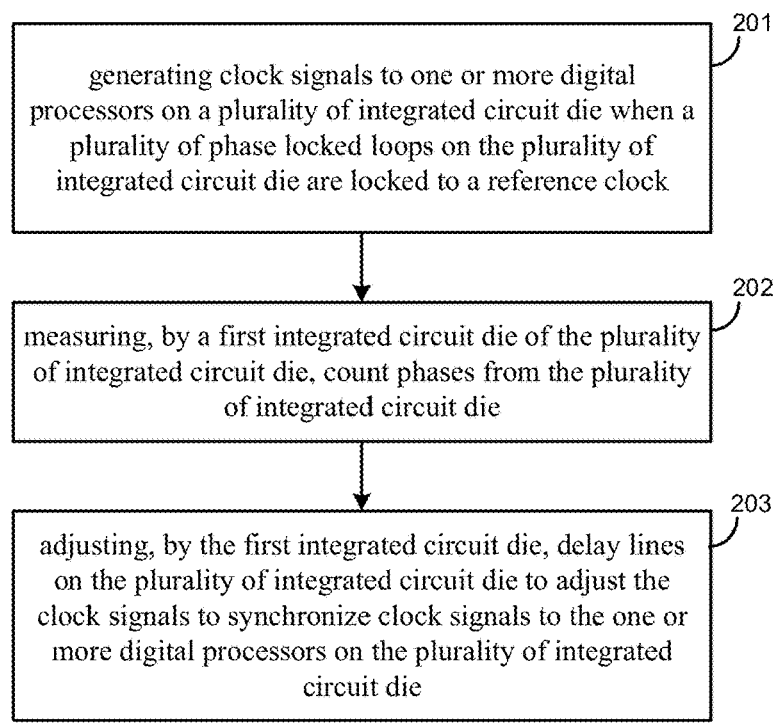
FIG. 2 illustrates a method of synchronizing a system according to an embodiment.

FIG. 2 illustrates a method of synchronizing a system according to an embodiment. Initially, when IC die power up or go through a reset, at 201, the IC die may generate clock signals to one or more digital processors on a plurality of integrated circuit die when a plurality of phase locked loops on the plurality of integrated circuit die are locked to a reference clock. At 202, a first integrated circuit die of the plurality of integrated circuit die may measure count phases from the plurality of integrated circuit die. In one embodiment, the count phases may be received in the first integrated circuit die from at least one of a plurality of processors on the plurality of integrated circuit die. At 203, the first integrated circuit die, may adjust delay lines on the plurality of integrated circuit die to adjust the clock signals to synchronize clock signals to the one or more digital processors on the plurality of integrated circuit die.

Figure 3:
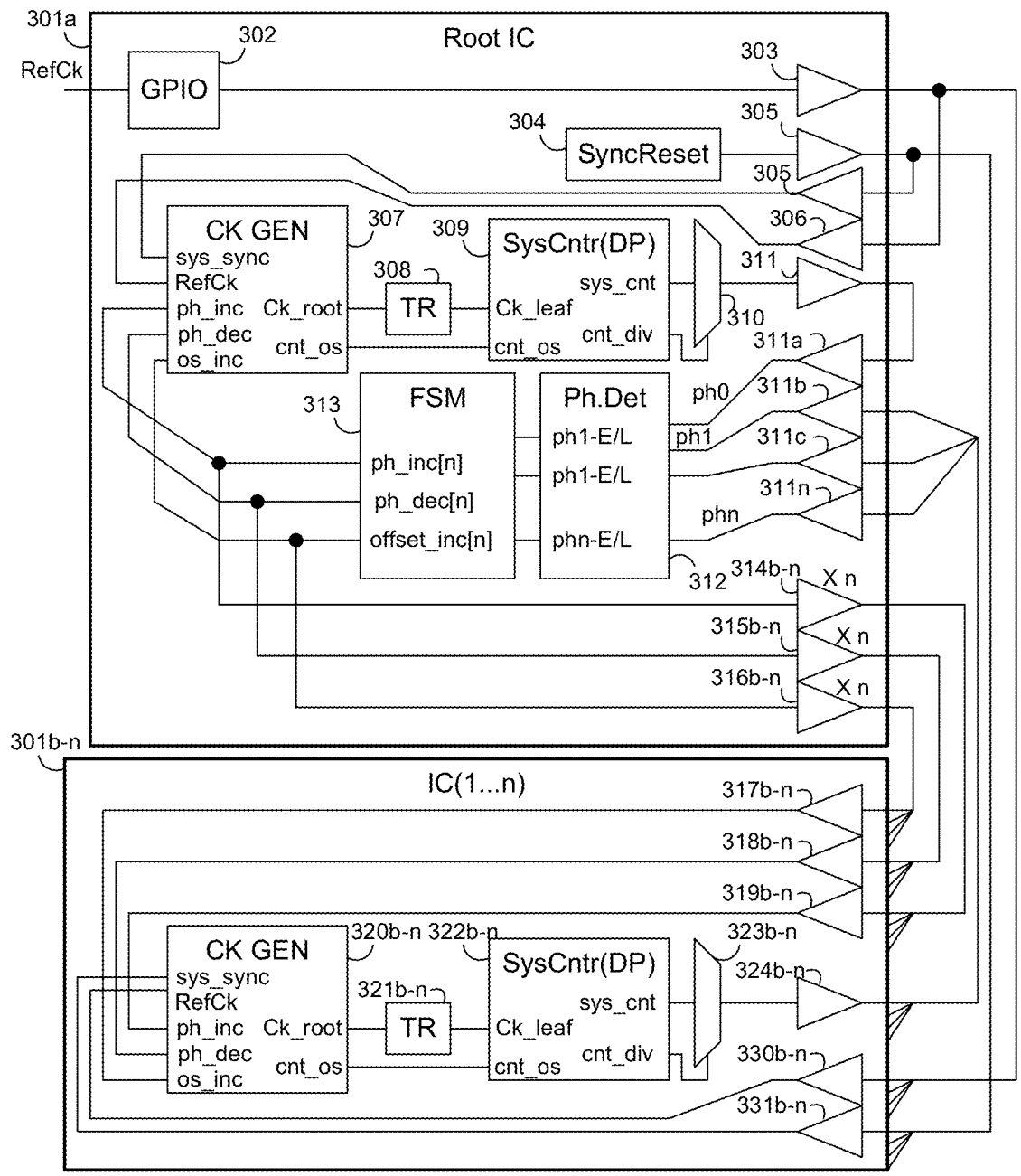
FIG. 3 illustrates a detailed example of a synchronization system according to an embodiment.

FIG. 3 illustrates a detailed example of a synchronization system according to an embodiment. In this example, a reference clock (RefCk) is received in a root integrated circuit 301a. RefCk may be received in a general purpose input/output port (GPIO) 302, for example, from a external system clock generator, such as a crystal based system clock generator. In some example systems, RefCk may be 100 MHz, for example. RefCk may be coupled through another GPIO driver 303 to other IC die 301b-n. Advantageously, each IC die 301a-n may include clock generator (CK GEN) 307 and 320b-n having a RefCk input coupled to receive RefCk. As described in more detail below CK GEN includes a PLL where RefCk is the input reference signal to which the PLL locks. Once RefCk starts, root IC 301a may wait for all PLLs on other IC die to lock. In various embodiments, each PLL may send a lock signal to root IC 301a, or root IC 301a may wait a predetermined amount of time for all the PLLs to lock. After the PLLs lock, a synchronization reset signal may be generated by SyncReset circuit 304. SyncReset 304 is coupled to a sys-sync input of each CK GEN circuit 307 and 320b-n external to IC die 301a-n so that the timing matches across all die. The SyncReset output signal causes the CK GEN circuit to start outputting a clock, CK_root, which may be a multiplied version of the reference frequency (e.g., 1 GHZ). CK_root is coupled through clock trees 308 and 321b-n on each IC die to a system counter (SysCntr(DP)) 309 and 322b-n, respectively. Each processor on each die may have a SysCntr(DP) circuit, where SysCntr (DP) generates a local count for each processor on each die.

Accordingly, there may be a clock tree between CK GEN and each processor on each die, and when CK_root arrives on the other side of each clock tree, it may be referred to as Ck_leaf, for example. Additionally, as illustrated here, CK GEN circuits may generate a count offset signal, cnt_os, to adjust a count in each SysCntr in each processor, for example.

Synchronization may be realized by coupling count phases from at least one processor on each IC die to a synchronization circuit. In this example, system count values, sys_cnt, are coupled to a multiplexers 310 and 323b-n. A system count may be changing at a frequency related to Ck_root (e.g., 1 GHZ, or 1ns). Accordingly, the lowest bit of sys_cnt, sys_cnt[0], may change every 1 ns, the second bit, sys_cnt[1] may change at a frequency of 2 ns, and so on. Particular bits may be selected by a count divide signal, cnt_div, to select bits for measuring the count phase of the count based on the desired granularity. For instance, multiplexer 310 may be coupled to sys_cnt[4] (16 ns signal), sys_cnt[5] (32 ns), sys_cnt[6] (64 ns), and sys_cnt[7] (128 ns) and the particular bit is selected based on how often a synchronization measurement wants to be performed—e.g., the faster the update, the more voltage and temperature variation can be canceled, but at the expense of higher power, for example. Selected bits of the count are examples of count phases. The count phases are coupled externally to IC die 301a-n through GPIO 311 and 324b-n, for path matching, and into GPIOs 311a-n.

In this example, synchronization circuit comprises a phase detector (Ph Det) 309 and control circuit (e.g., a finite state machine, FSM) 313. Ph Det 309 receives count phases (ph0, ph1, ph2, . . . , phn) from IC die 301a-n. Ph Det 309 measures the phase differences and may generate an "early" or "late" (E/L) signal for each die to finite state machine (FSM) 313. FSM 313 generates "n" (e.g., n=number of IC die) phase increase signals (ph_inc[n]), phase decrease signals (ph_dec[n]), and count offset increase signals (offset_inc[n]). Phase increase, phase decrease, and offset increase signals are coupled to each CK GEN 307 and 320b-n on each IC die 301a-n. Phase increase and decrease signals increase or decrease a delay in the Ck_root clock, and count offset increase produces an offset in the count (cnt_os), which is coupled from CK GEN to each SysCntr 309 and 322b-n. Thus, Ph Det 312 and FSM 313 adjust the delay to synchronize clock signals and adjust the count to synchronize counts across all digital processors in the system. Accordingly, FSM 313 outputs phase alignment info to each chip to adjust clock phase and count and determines when phase of entire chip is locked. When the entire system is locked, FSM may write to a "complete" register, for example.

Figure 4:
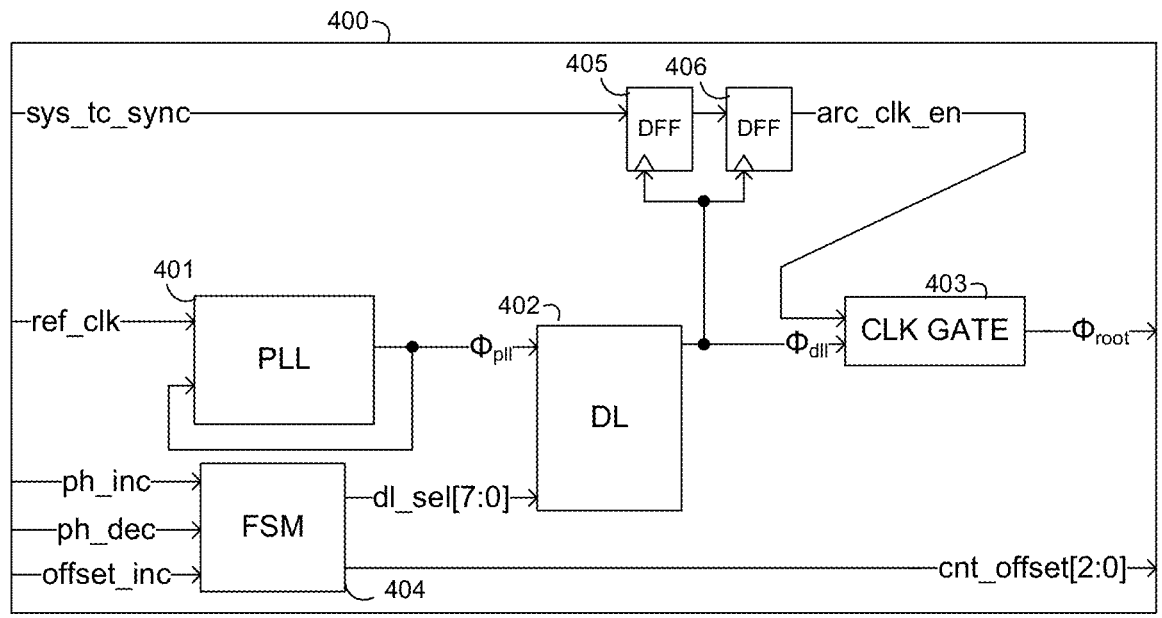
FIG. 4 illustrates a phase locked loop and delay line in a synchronization system according to an embodiment.

FIG. 4 illustrates a phase locked loop and delay line (DL) in a clock generator 400 according to an embodiment. In this example, PLL 401 is coupled to a reference clock, ref_clk, which may be multiplied up to produce a PLL clock output, Φpll. The PLL clock output is coupled to a delay line (DL), which produces a delayed clock, Φdl. The delayed clock may be gated by a clock gate (CLK GATE) 403. The clock gate may be activated, thereby passing the clock through to the output, by a system sync signal, sys_to_sync, which is coupled to CLK GATE 403 through two flip flops 405 and 406. DL 402 may receive a delay select signal, dl_sel[7:0] to programmable a delay. Delay select may be generated by another control circuit (here, another FSM) 404 in response to phase increase and phase decrease signals described above. Additionally, control circuit 404 may produce a count offset signal, cnt_offset[2:0], in response to the count offset signal described above. The count offset signal may be coupled to a processor to change the count, for example, to synchronize counts across different processors.

Figure 5:
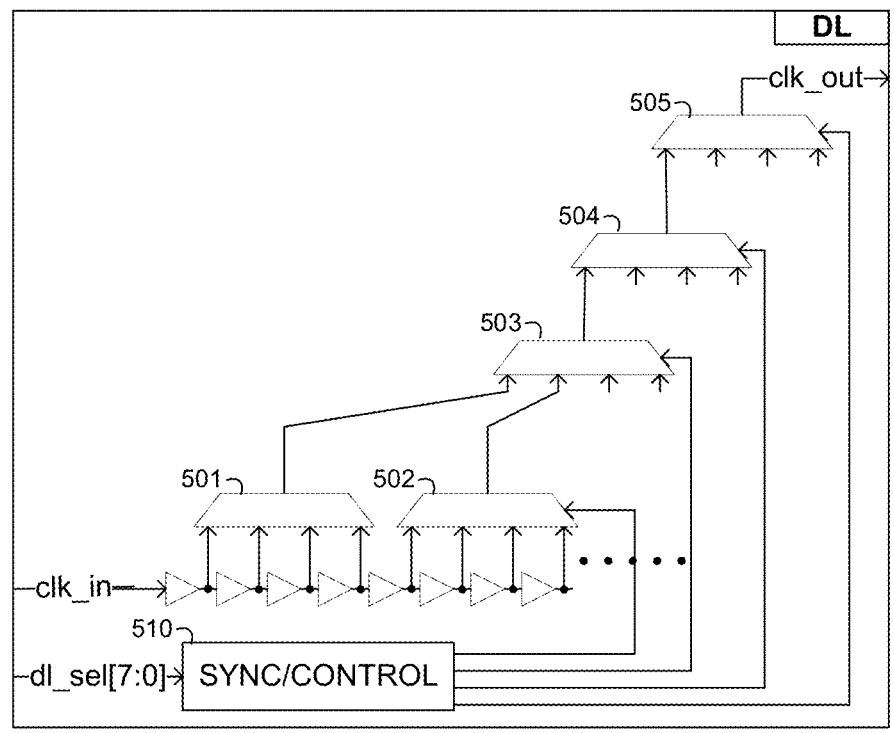
FIG. 5 illustrates an example delay line according to an embodiment.

FIG. 5 illustrates an example delay line (DL) according to an embodiment. In this example, a DL includes a plurality of delay lines 520 coupled through multiplexers 501-505 to produce a clock output signal. Multiplexers 501-505 receive control signals from a SYNC/CONTROL circuit 510. SYNC/CONTROL circuit 510 receives a DL select input, dl_sel[7:0], which may be from an FSM as described above.

Figure 6:
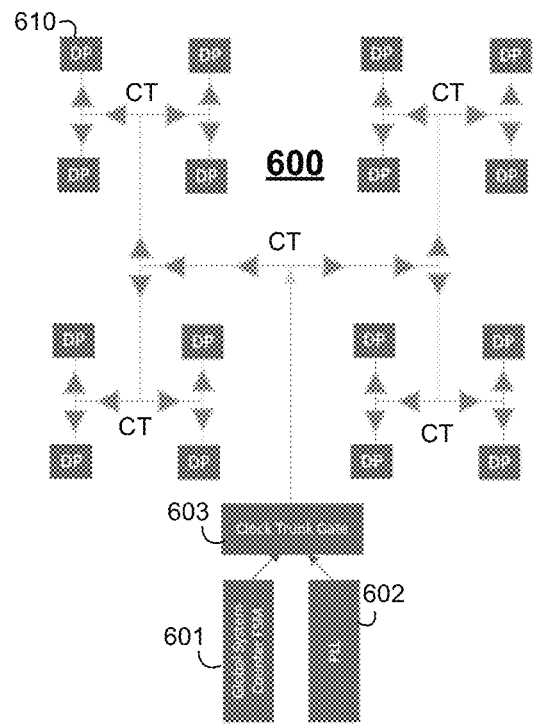
FIG. 6 shows an example of multiple processor cores coupled to a clock generator on a single die according to an embodiment.

FIG. 6 shows an example of multiple processor cores coupled to a clock generator on a single die according to an embodiment. As mentioned above, an IC die 600 may comprise multiple processor cores (CPUs), such as processor 610, which are labeled DP (i.e., data path). In this example, a global system counter FSM 601 and PLL 602 may be coupled to a clock trunk gate 603, which sends a clock signal into clock tree (CT) to processors (DP). Synchronization circuits described herein may be used to synchronize the clock signals and counts across multiple processors cores on multiple IC die 600, for example.

Figure 7:
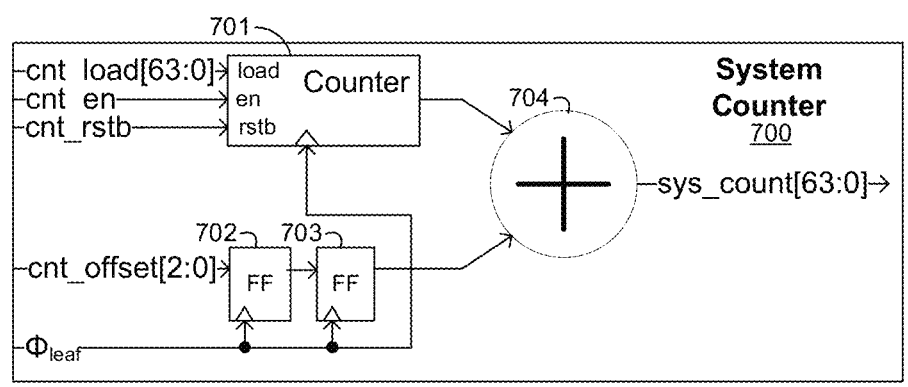
FIG. 7 shows an example of a system counter in each processor core according to an embodiment.

FIG. 7 shows an example of a system counter in each processor core according to an embodiment. System counter 700 includes a counter 701 including a load input, count enable input, and count reset input. Counter 701 is clocked by a leaf clock signal and produces a digital value sys_count [63:0]. An offset may be added to the count by count offset signal, cnt_offset[2:0], which is coupled through two flip flops 702 and 703. The counter offset value, which may be negative or positive, is added to the output of the counter to produce a system count value.

FURTHER EXAMPLES

Each of the following non-limiting features in the following examples may stand on its own or may be combined in various permutations or combinations with one or more of the other features in the examples below.

In one embodiment, the present disclosure includes a synchronization system comprising: a first integrated circuit die comprising: one or more first digital processors; a synchronization circuit; and a first clock generator; and one or more second integrated circuit die comprising: one or more second digital processors; and a second clock generator, wherein the synchronization circuit receives count phases from the first and second integrated circuit die and adjusts delay lines in the first and second clock generators to synchronize clock signals to first and second digital processors.

In one embodiment, the synchronization circuit comprises: a phase detector coupled to measure phases on the first integrated circuit die and the one or more second integrated circuit die to determine phase differences between counts; and a synchronization control circuit to generate control signals to adjust the phase and count on the one or more first digital processors and the one or more second digital processors.

In one embodiment, the first and second clock generators comprise: a phase locked loop; a delay line; and a control circuit to adjust the delay of the delay line to change a phase of a corresponding clock signal of said clock signals and to adjust counts of the one or more first digital processors and the one or more second digital processors.

In one embodiment, the clock signals are generated to the first and second digital processors after the phase locked loop in each clock generator on each integrated circuit die locked to a reference clock.

In one embodiment, the first integrated circuit die measures count phases from the first and second integrated circuit die.

In one embodiment, the first integrated circuit die adjusts each delay line on the first and second integrated circuit die to adjust the clock signals to synchronize clock signals to the first and second digital processors.

In one embodiment, the first integrated circuit die and one or more second integrated circuit die comprise a single clock generator and a plurality of digital processors each comprising system counters configured to receive said clock signals from corresponding delay lines and generate a count, wherein a particular bit of the count from one system counter on each of the one or more second integrated circuit die are selectively coupled to a phase detector on the first integrated circuit die to determine phase differences, and in accordance therewith, adjust a delay of the delay line and count of the one or more first digital processors and the one or more second digital processors.

In one embodiment, the first integrated circuit die and one or more second integrated circuit die comprise a plurality of processors, and wherein each processor receives a clock signal of said clock signals and generates a count, and wherein the count phases are generated from the count.

In one embodiment, the system further comprises a plurality of clock trees coupled between the first clock generator and the one or more first digital processors and between the second clock generator and the one or more second digital processors.

In another embodiment, the present disclosure includes method of synchronizing processors comprising: generating clock signals to one or more digital processors on a plurality of integrated circuit die when a plurality of phase locked loops on the plurality of integrated circuit die are locked to a reference clock; measuring, by a first integrated circuit die of the plurality of integrated circuit die, count phases from the plurality of integrated circuit die; and adjusting, by the first integrated circuit die, delay lines on the plurality of integrated circuit die to adjust the clock signals to synchronize clock signals to the one or more digital processors on the plurality of integrated circuit die.

In one embodiment, the method further comprises, in response to measuring the count phases, adjusting a count in the one or more digital processors on the plurality of integrated circuit die.

In one embodiment, adjusting the delay lines comprises adjusting a single delay line in each of the plurality of integrated circuit die.

In one embodiment, measuring the count phases comprises: receiving, on a single integrated circuit die of the plurality of integrated circuit die, a local count phase and one or more remote count phases in a phase detector; determining, by the phase detector, whether each count phase is early or late; and generating, by a state machine, control signals for adjusting the phase and count, wherein the control signals are sent to the plurality of integrated circuit die.

In one embodiment, the control signals comprise: a count offset signal; and one or more phase adjustment signals.

In one embodiment, each digital processor of the one or more digital processors on the plurality of integrated circuit die comprises a system counter having said count phases.

In one embodiment, each digital processor of the one or more digital processors on the plurality of integrated circuit die comprises a system counter having said count phases.

In another embodiment, the present disclosure includes a synchronization system comprising: means for generating clock signals to one or more digital processors on a plurality of integrated circuit die when a plurality of phase locked loops on the plurality of integrated circuit die are locked to a reference clock; means for measuring count phases from the plurality of integrated circuit die; and means for adjusting delay lines on the plurality of integrated circuit die to adjust the clock signals to synchronize clock signals to the one or more digital processors on the plurality of integrated circuit die.

In one embodiment, the means for generating clock signals comprises a phase locked loop and a delay line.

In one embodiment, the means for measuring count phases comprises a phase detector coupled to receive at least one bit of a count from the plurality of integrated circuit die.

In one embodiment, the means for adjusting delay lines comprises a plurality of multiplexers coupled to a control circuit.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A synchronization system comprising:
   a first integrated circuit die comprising:
      one or more first digital processors;
      a synchronization circuit; and
      a first clock generator; and
   one or more second integrated circuit die comprising:
      one or more second digital processors; and
      a second clock generator,
   wherein the synchronization circuit receives count phases from the first and second integrated circuit die and adjusts delay lines in the first and second clock generators to synchronize clock signals to first and second digital processors,
   wherein the first integrated circuit die and one or more second integrated circuit die comprise a single clock generator and a plurality of digital processors each comprising system counters configured to receive said clock signals from corresponding delay lines and generate a count; and
   wherein a particular bit of the count from one system counter on each of the one or more second integrated circuit die are selectively coupled to a phase detector on the first integrated circuit die to determine phase differences, and in accordance therewith, adjust a delay of a delay line and count of the one or more first digital processors and the one or more second digital processors.

2. The system of claim 1, wherein the synchronization circuit comprises:
   a phase detector coupled to measure phases on the first integrated circuit die and the one or more second integrated circuit die to determine phase differences between counts; and
   a synchronization control circuit to generate control signals to adjust the phase and count on the one or more first digital processors and the one or more second digital processors.

3. The system of claim 1, wherein the first and second clock generators comprise:
a phase locked loop;
the delay line; and
a control circuit to adjust the delay of the delay line to change a phase of a corresponding clock signal of said clock signals and to adjust counts of the one or more first digital processors and the one or more second digital processors.

4. The system of claim 3, wherein the clock signals are generated to the first and second digital processors after the phase locked loop in each clock generator on each integrated circuit die locked to a reference clock.

5. The system of claim 3, wherein the first integrated circuit die measures count phases from the first and second integrated circuit die.

6. The system of claim 3, wherein the first integrated circuit die adjusts each delay line on the first and second integrated circuit die to adjust the clock signals to synchronize clock signals to the first and second digital processors.

7. The system of claim 1, wherein the first integrated circuit die and one or more second integrated circuit die comprise a plurality of processors, and wherein each processor receives a clock signal of said clock signals and generates a count, and wherein the count phases are generated from the count.

8. The system of claim 1, further comprising a plurality of clock trees coupled between the first clock generator and the one or more first digital processors and between the second clock generator and the one or more second digital processors.

9. A method of synchronizing processors comprising:
generating clock signals to one or more digital processors on a plurality of integrated circuit die when a plurality of phase locked loops on the plurality of integrated circuit die are locked to a reference clock;
measuring, by a first integrated circuit die of the plurality of integrated circuit die, count phases from the plurality of integrated circuit die; and
adjusting, by the first integrated circuit die, delay lines on the plurality of integrated circuit die to adjust the clock signals to synchronize clock signals to the one or more digital processors on the plurality of integrated circuit die,
wherein the first integrated circuit die and one or more second integrated circuit die comprise a single clock generator and a plurality of digital processors each comprising system counters configured to receive said clock signals from corresponding delay lines and generate a count, and
wherein a particular bit of the count from one system counter on each of the one or more second integrated circuit die are selectively coupled to a phase detector on the first integrated circuit die to determine phase differences, and in accordance therewith, adjust a delay of a delay line and count of one or more first digital processors of the first integrated circuit die and one or more second digital processors of the second integrated circuit die.

10. The method of claim 9, further comprising, in response to measuring the count phases, adjusting a count in the one or more digital processors on the plurality of integrated circuit die.

11. The method of claim 9, wherein adjusting the delay lines comprises adjusting a single delay line in each of the plurality of integrated circuit die.

12. The method of claim 9, wherein measuring the count phases comprises:
receiving, on a single integrated circuit die of the plurality of integrated circuit die, a local count phase and one or more remote count phases in a phase detector;
determining, by the phase detector, whether each count phase is early or late; and
generating, by a state machine, control signals for adjusting the phase and count, wherein the control signals are sent to the plurality of integrated circuit die.

13. The method of claim 12, wherein the control signals comprise:
a count offset signal; and
one or more phase adjustment signals.

14. The method of claim 9, wherein each digital processor of the one or more digital processors on the plurality of integrated circuit die comprises a system counter having said count phases.

15. The method of claim 9, wherein the first integrated die comprising a first clock generator and a wherein adjusting, by the first integrated circuit die, delay lines on the plurality of integrated circuit die to adjust the clock signals to synchronize clock signals to the one or more digital processors on the plurality of integrated circuit die comprising adjusting, by the first integrated circuit die, delay lines on the plurality of integrated circuit die to adjust the clock signals to synchronize clock signals to the one or more digital processors on the plurality of integrated circuit die to the clock signal of the first clock generator.

16. A synchronization system comprising:
means for generating clock signals to one or more digital processors on a plurality of integrated circuit die when a plurality of phase locked loops on the plurality of integrated circuit die are locked to a reference clock;
means for measuring count phases from the plurality of integrated circuit die; and
means for adjusting delay lines on the plurality of integrated circuit die to adjust the clock signals to synchronize clock signals to the one or more digital processors on the plurality of integrated circuit die,
wherein the first integrated circuit die and one or more second integrated circuit die comprise a single clock generator and a plurality of digital processors each comprising system counters configured to receive said clock signals from corresponding delay lines and generate a count; and
wherein a particular bit of the count from one system counter on each of the one or more second integrated circuit die are selectively coupled to a phase detector on the first integrated circuit die to determine phase differences, and in accordance therewith, adjust a delay of a delay line and count of one or more first digital processors of the first integrated circuit die and one or more second digital processors of the second integrated circuit die.

17. The system of claim 16, wherein the means for generating clock signals comprises a phase locked loop and a delay line.

18. The system of claim 16, wherein the means for measuring count phases comprises a phase detector coupled to receive at least one bit of a count from the plurality of integrated circuit die.

19. The system of claim 16, wherein the means for adjusting delay lines comprises a plurality of multiplexers coupled to a control circuit.

* * * * *